United States Patent
Tanaka et al.

(10) Patent No.: US 10,627,335 B2
(45) Date of Patent: Apr. 21, 2020

(54) STRUCTURE FOR USE IN INFRARED SPECTROSCOPY AND INFRARED SPECTROSCOPY METHOD USING SAME

(71) Applicant: RIKEN, Saitama (JP)

(72) Inventors: Takuo Tanaka, Saitama (JP); Atsushi Ishikawa, Saitama (JP)

(73) Assignee: RIKEN, Saitama (JP)

( * ) Notice: Subject to any disclaimer, the term of this patent is extended or adjusted under 35 U.S.C. 154(b) by 165 days.

(21) Appl. No.: 15/744,695

(22) PCT Filed: Jul. 7, 2016

(86) PCT No.: PCT/JP2016/070199
§ 371 (c)(1),
(2) Date: Jan. 12, 2018

(87) PCT Pub. No.: WO2017/010411
PCT Pub. Date: Jan. 19, 2017

(65) Prior Publication Data
US 2018/0202918 A1    Jul. 19, 2018

(30) Foreign Application Priority Data
Jul. 13, 2015 (JP) .................................. 2015-139701

(51) Int. Cl.
*G01N 21/01* (2006.01)
*G01N 21/3581* (2014.01)
(Continued)

(52) U.S. Cl.
CPC ............. *G01N 21/01* (2013.01); *G01N 21/35* (2013.01); *G01N 21/3581* (2013.01); *G01N 21/554* (2013.01); *G01N 2021/3595* (2013.01)

(58) Field of Classification Search
CPC ...... G01N 21/01; G01N 21/35; G01N 21/554; G01N 21/3595
See application file for complete search history.

(56) References Cited

U.S. PATENT DOCUMENTS

2007/0014006 A1* 1/2007 Tanaka ................... B82Y 20/00
                                                 359/485.02
2012/0154793 A1* 6/2012 Pryce ................. G01N 21/3581
                                                 356/51
(Continued)

FOREIGN PATENT DOCUMENTS

JP       2009-80109 A       4/2009

OTHER PUBLICATIONS

Hou-Tong Chen, "Active terahertz metamaterial devices", Nov. 20, 2006, nature, vol. 444 (Year: 2006).*
(Continued)

*Primary Examiner* — Maurice C Smith
(74) *Attorney, Agent, or Firm* — Seed IP Law Group LLP

(57) ABSTRACT

In an embodiment of the present disclosure, a structure comprising an infrared ray absorption surface is provided for use in infrared spectroscopy, and the infrared ray absorption surface absorbs infrared rays in a detection wavelength range that covers the response wavelengths of a substance to be detected. The structure comprises, for example, a metal substrate having a metal surface, metal components arranged at positions facing the metal surface, and a support part that supports each of the metal components relative to the metal surface, and a resonator for the infrared ray absorption surface is formed by the metal substrate, the metal components and the support parts. Additionally, in an embodiment of the present disclosure, an infrared spectroscopy method wherein a specimen is brought into close contact to the infrared ray absorption surface of the structure is also provided.

13 Claims, 11 Drawing Sheets

(51) Int. Cl.
*G01N 21/35* (2014.01)
*G01N 21/552* (2014.01)

(56) References Cited

U.S. PATENT DOCUMENTS

2013/0148194 A1* 6/2013 Altug .................. G01N 21/554
359/350
2014/0264026 A1 9/2014 Brown et al.

OTHER PUBLICATIONS

Kai Chen, "Dual-Band Perfect Absorber for Multispectral Plasmon-Enhanced Infrared Spectroscopy", ACSNano, vol. 6 2012 (Year: 2012).*

Alici, "Hybridization of Fano and Vibrational Resonances in Surface-Enhanced Infrared Absorption Spectroscopy of Streptavidin Monolayers on Metamaterial Substrates," *IEEE Transactions on Nanotechnology* 13(2):216-221, 2014.

Brown et al., "Surface-Enhanced Infrared Absorption Using Individual Cross Antennas Tailored to Chemical Moieties," *J. Am. Chem. Soc.* 135:3688-3695, 2013.

Chen et al., "Uniaxial-isotropic Metamaterials by Three-Dimensional Split-Ring Resonators," Adv. Optical Mater. 3:44-48, 2015.

International Search Report and Written Opinion, dated Oct. 4, 2016, for International Application No. PCT/JP2016/070199, 15 pages. (with English Translation).

Ishikawa et al., "Background-suppressed surface-enhanced molecular detection by metamaterial infrared absorber," *Proceedings of SPIE* 9163:91632Q, 2014. (5 pages).

Ishikawa et al., "Negative Magnetic Permeability in the Visible Light Region," *Physical Review Letters* 95:237401, 2005. (4 pages).

Osawa et al., "Surface-Enhanced Infrared Absorption of p-Nitrobenzoic Acid Deposited on Silver Island Films: Contributions of Electromagnetic and Chemical Mechanisms," *J. Phys. Chem.* 95:9914-9919, 1991.

Søndergaard et al., "Plasmonic black gold by adiabatic nanofocusing and absorption of light in ultra-sharp convex grooves," *Nature Communications* 3969, 2012. (6 pages).

* cited by examiner

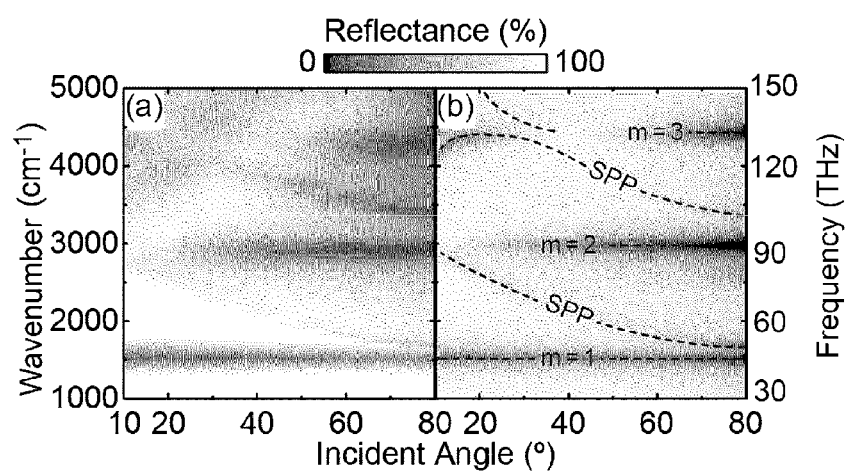
*FIG.6A*  *FIG.6B*

STRUCTURE FOR USE IN INFRARED SPECTROSCOPY AND INFRARED SPECTROSCOPY METHOD USING SAME

BACKGROUND

Technical Field

The present disclosure relates to a structure for use in infrared spectroscopy, and to the infrared spectroscopy using the same. More specifically, the present disclosure relates to the above structure which is suitable for detecting a substance to be detected in a specimen by the infrared spectroscopy, and to the infrared spectroscopy using the structure.

Description of the Related Art

Infrared spectroscopy occupies an important position in materials science, medical science, and security detection technology. In the infrared spectroscopy, by using the properties that a substance absorbs infrared rays having a specific wavelength (wavenumber) peculiar to the substance, any of the presence/absence, the component content, the type, the chemical structure, and the ambient information for a substance of interest (substance to be detected: test material) in the specimen is determined. This is because this absorption is usually associated with molecular vibration, and dominant information with respect to the molecular structure, the composition, and the ambient condition is reflected in the molecular vibration. In typical infrared spectroscopy, the infrared rays after having been transmitted through or reflected from the specimen are compared with appropriate reference conditions. Then, the substance to be detected is quantified by a process of determining whether or not absorption peculiar to the substance to be detected is observed in the specimen, by precisely determining the absorption wavelength, or by using the absorption quantity as a clue. For a rapid and convenient infrared inspection technology in various applications, it is preferable that such technology can directly detect as small amount as possible of molecules through far-field measurement rather than proximity measurement that adopts a probe or the like.

On the other hand, light absorption, which is one of the most fundamental light-matter interactions, is also an essential phenomenon for a variety of the optical application fields, such as photovoltaic cells and thermal management. Materials having a large absorption constant may exhibit strong light absorption, but they often show strong reflection due to a large impedance mismatching at the interface with other materials. In response to this mismatch at the interface, it has been tried to artificially adjust or tailor resonance and dispersion of material, by adopting artificial substances including metallodielectric nanostructures that has been emerging as one of plasmonic metamaterials. In the field of the plasmonic metamaterials, a new degree of freedom has been introduced by manipulating the optical field at a nano- to macroscopic scale, whereby an attractive technology for sensing applications has been developed. The most important feature among such capabilities is the artificial controllability of two separate macroscopic optical properties of refractive index and characteristic impedance, which makes it possible to control light to an ultimate level.

In the above described infrared spectroscopy, as means for measuring the infrared spectrum with a high sensitivity for a very small amount of the object specimen, surface-enhanced infrared absorption (SEIRA) spectroscopy using a mirror such as a metal thin film has been vigorously studied (for instance, Patent Literature 1). In SEIRA, a metal surface having fine particles of nanometer order thereon is manufactured, and object molecules to be detected are adsorbed to a metal thin film composed of the above fine particles. In fact, a dramatic improvement of the sensitivity by several orders of magnitude has been demonstrated by tailored plasmonic nanostructures (Non-Patent Literature 1). Currently, efforts to improve the detection sensitivity in infrared spectroscopy using the metamaterials are focused on hotspot engineering that pursues a phenomenon in which electromagnetic fields are enhanced in between fine particles, in the vicinity of a corner portion, and the like (for instance, Non-Patent Literature 2). Furthermore, as a result of recent development of a metamaterial absorber, strong or even perfect absorption is achieved within a certain frequency range (Non-Patent Literature 3). In the metamaterial absorber, unique surface conditions are given in which the absorption characteristics associated with intense plasmonic enhancement are adjusted, and accordingly various potential applications such as a high-efficiency thermal radiator and high-sensitive bio-chemical sensing have been proposed.

CITATION LIST

Patent Literature

Patent Literature 1: Japanese Patent Laid-Open No. 2009-080109

Non Patent Literature

Non Patent Literature 1: M. Osawa and M. Ikeda, "Surface-enhanced infrared absorption of p-nitrobenzoic acid deposited on silver island films: contributions of electromagnetic and chemical mechanisms," J. Phys. Chem. 95, 9914 (1991).

Non Patent Literature 2: L. V. Brown, et al. "Surface-enhanced infrared absorption using individual cross antennas tailored to chemical moieties," J. Am. Chem. Soc. 135, 3688 (2013).

Non Patent Literature 3: T. Sondergaard, et al. "Plasmonic black gold by adiabatic nanofocusing and absorption of light in ultra-sharp convex grooves," Nat. Commun. 3, 969 (2012).

Non Patent Literature 4: A. Ishikawa, T. Tanaka, and S. Kawata, "Negative Magnetic Permeability in the Visible Light Region," Phys. Rev. Lett. 95, 237401 (2005). 10.1103/PhysRevLett.95.237401

Non Patent Literature 5: C.-C. Chen, A. Ishikawa, Y.-H. Tang, M.-H. Shiao, D. P. Tsai, and T. Tanaka, "Uniaxial-isotropic Metamaterials by Three-dimensional Split-Ring Resonators," Adv. Opt. Mater. 3, pp. 44-48 (DOI: 10.1002/adom.201400316) (2015).

BRIEF SUMMARY DISCLOSURE

Technical Problem

The universal problem of the infrared spectroscopy which obtains various information about the substance to be detected such as molecules is that it is difficult to quickly and simply measure the substance to be detected under such conditions that the signal is weak, in particular, that the specimen is an extremely small amount. As a countermeasure against this problem, in SEIRA, it is tried to utilize an electric field enhancement due to superposition of the optical electric fields that are produced by a mirror. In advanced SEIRA, a technique that may be referred to as hot-spot engineering attracts attention, in which gaps between fine particles are used and positions (hot spots) are created where an electromagnetic field is strengthened locally. A technology which has recently been investigated intensively in order to aim for a level of attomole to zeptomole ($10^{-18}$ to $10^{-21}$ moles) is the above described hot-spot engineering; and is the spatial overlapping of near-field enhancement between plasmons and molecular vibrations, and the overlapping of wavelength modes. However, since the SEIRA is a technique of finding out a lowered reflectivity portion caused by the enhanced infrared absorption, a signal indicating the lowered portion appears in bright reflection light (background light) reflected from a metal thin film. As a result, the most part of such bright reflection light directly gets into the detector, which becomes problematic stray light. When the absorption is weak, the above described stray light and relatively bright background light form noises by themselves, which makes it difficult to obtain a high signal-to-noise ratio.

In addition, in the SEIRA, the degree of enhancement of the obtained signal greatly depends on the nano-level structure of the metal surface. For instance, when particles are used, the narrower is the spacing between the particles, the more strongly is the electric field enhanced. However, it is not easy to efficiently manufacture and evaluate such a metal structure of nanometer order (for instance, Patent Literature 1). Not only in the case where the thin films of the metal structure are different from each other, but also in the case within one film, a problem arises in reproducibility, because degree of absorption in the infrared range tends to change depending on the observed region. In reality, although the SEIRA provides a considerably large signal intensity in practical applications, it is true that the detection of picomole ($10^{-12}$ moles) level specimens (in other words, of monomolecular film) still remains challenging.

Solution to Problem

The present inventors have found that a significant improvement of the sensitivity based on a novel principle will be yielded in the field of infrared spectroscopy, by using a material body (structure) having an infrared ray absorption surface in the infrared spectroscopy. Specifically, in an aspect of the present disclosure, a structure for use in infrared spectroscopy will be provided which has an infrared ray absorption surface configured to absorb infrared rays in a detection wavelength range covering the response wavelength of a substance to be detected.

In another aspect of the disclosure, a method of an infrared spectroscopy for a substance to be detected is also provided, which includes steps of: providing a structure for use in the infrared spectroscopy, which has an infrared ray absorption surface configured to absorb infrared rays in a detection wavelength range covering a response wavelength of the substance to be detected, in such a state that a specimen potentially containing the substance to be detected is brought into close contact with the infrared ray absorption surface; irradiating the infrared ray absorption surface with the infrared rays in the detection wavelength range; and detecting an intensity spectrum of reflected infrared rays from the infrared ray absorption surface.

In any of the aspects of the present disclosure, the infrared ray absorption surface provided in the above described structure is used. The infrared ray absorption surface is a surface that is configured to absorb rays in a certain wavelength range out of the emitted infrared rays, to some extent. In the first place the above infrared ray absorption surface of the above described structure is manufactured so that the response wavelength of the substance to be detected falls within the wavelength range, and thereafter the infrared rays for detecting the substance to be detected are emitted to irradiate the infrared ray absorption surface. When detection of reflected infrared rays is conducted on the infrared ray absorption surface, the resulting component in the above-mentioned wavelength range should be reduced, and accordingly a lowered background is provided. This leads to the reduction of the infrared rays which may well become stray light for an infrared ray detector. Since the wavelength range in which the infrared ray absorption surface absorbs the infrared rays is a detection target of the infrared spectroscopies that will be achieved in each aspect of the present disclosure, it is therefore particularly referred to as a detection wavelength range in the present application.

In the structure having the above described features, when the substance to be detected is positioned very close to the infrared ray absorption surface, both of the infrared ray absorption surface and the substance to be detected respond to the infrared rays, in particular, corresponding to the response wavelength out of the detection wavelength range. Because of this, the infrared ray absorption characteristics for the infrared ray absorption surface are disturbed by the response of the substance to be detected. Such disturbance has an effect of weakening the absorption typically by the infrared ray absorption surface, and accordingly under suitable conditions, the peak where increased intensity of the infrared ray is observed should be found at a wavelength that is substantially same as the above described response wavelength. Since this change in the infrared spectrum is sensitive, which originates in a phenomenon that the substance to be detected disturbs the low reflection condition of the infrared ray absorption surface, detection with high sensitivity at a high signal-to-noise ratio is achieved in combination with the background reduced by the absorption. Additionally, when the background producing noise is reduced, it also becomes unlikely that saturation takes place even in the case where the detector is operated to accumulate signals. Also from this point of view, both of the above described aspects are highly practical.

In the above described aspects of the present disclosure, it is particularly advantageous that the absorption on the infrared ray absorption surface of the structure is generated as a result of the resonance of the resonator. If a technology referred to as so-called metamaterial or metasurface is applied, the resonance can be occurred in a target frequency range, by an operation of tailoring the response to temporal vibration in an electric field or a magnetic field of the infrared rays. The electromagnetic resonant frequency and its width can be tailored in the structure, by placing metal components with a designed size and shape on the surface of the structure or in the vicinity of the surface, which makes it possible to adapt the detection wavelength range to the target response wavelength of the objective substance to be detected. The resonance between this electromagnetic field (infrared ray, or light) and the structure localizes the electromagnetic energy originating in the infrared rays onto the infrared ray absorption surface. The localized electromagnetic energy is multiply absorbed in the vicinity of the same surface according to the Q value of this resonance, and accordingly the absorption efficiently occurs, which leads to the energy dissipation in a form of loss. When the infrared ray absorption surface is properly tailored, an energy fraction to be re-emitted in the form of the infrared rays out of the electromagnetic field oscillating in the detection wavelength range becomes very weak. In the above described aspect of the present disclosure, the infrared rays of the response wavelength of the substance to be detected or the wavelength in the vicinity thereof are covered in the detection wavelength range. Therefore the infrared rays cause not only the resonance between the light and the structure, but also the resonance between the electromagnetic field (or light) and the molecular vibrations. Since the resonance between the light and the molecular vibrations acts also on the absorption due to the resonance between the light and the structure, its influence appears on the absorption spectrum of the infrared ray absorption surface, which is finally detected. The interaction between the phenomena originating in this resonance is particularly sensitively detected in the structure in which the infrared ray absorption surface is based on the principle of the resonance.

The infrared ray in the present application is an electromagnetic wave which is generally included in a wavelength region, for instance, of 1 μm to 1 mm (frequency region of 300 GHz to 300 THz). Among the infrared rays, the above infrared ray includes a wavelength range suitable for infrared spectroscopy, specifically, a far-infrared to mid-infrared region or a THz wave region (wavelength region of 20 μm to 600 μm: and frequency region of 0.5 THz to 15 THz), and also include a wavenumber region of 650 to 1300 $cm^{-1}$ (wavelength region of 7.7 μm to 15.4 μm, or frequency range of 19.5 THz to 39 THz), in particular, which is also referred to as a finger print region. In the present application the terminology of the conventional use in the technological field of the present disclosure is used, so long as it does not render the description ambiguous. For instance, it occasionally occurs to use expressions which are used in optical fields such as "light", "light source", "light emission", "transmitted light", "reflection light", for electromagnetic waves other than visible light, such as electromagnetic radiation in the infrared region. Therefore, the electromagnetic wave in the infrared ray region may also be referred to as infrared light. Furthermore, when the infrared rays are characterized according to the conventional use of infrared spectroscopy, nomenclatures or terminologies on the wavelength region, the wavenumber range or the frequency range are used. For instance, when the frequency is expressed, it occasionally occurs to use a numerical value and a unit of the wavenumber for easiness of understanding, and show the numerical value of the wavenumber in such a manner that the value decreases toward the right on the axis of the graph. In addition, it also occurs to describe the numerical value and the unit of frequency, while expressing the wavelength, in some cases. These values are mutually converted in accordance with the dispersion relationship of $f=c/\lambda$ (where f denotes frequency, $\lambda$ wavelength in vacuum, and c the velocity of light), which also holds for ordinary infrared rays. It means that the detection wavelength range, for instance, should be understood not only as the range of the wavelength, but also as the range of the frequency and the range of the wavenumber which have been converted. The response wavelength should be also similarly understood to the above description. The wavenumber in the description of the present application is defined by the inverse number $(1/\lambda)$ of the wavelength, is described usually by using $cm^-$ as the unit, and is different from the wavenumber of the angle unit defined by a factor of $2\pi/\lambda$. Furthermore, as for the wavelengths and the wavenumbers, the numerical value in the vacuum is occasionally used, even though the electromagnetic wave is transmitted through a medium having a refractive index larger than 1, in accordance with the custom in the field of optical technology. The response wavelength of the substance to be detected generally refers to the wavelength of infrared rays that cause interaction due to molecular vibrations or the like. Therefore, the wavelength is expressed as the response wavelength, at which the absorption due to the substance to be detected is observed if the substance to be detected is measured in the ordinary infrared spectroscopy; and therefore the infrared ray having the response wavelength may not always be absorbed for any implementation of the aspects in the present application. This response wavelength reflects the features of the substance to be detected, accordingly there is a case where one or more response wavelengths are associated with a single substance to be detected; there is also a case where the response wavelength has a certain wavelength width originating in the molecular vibrations; and there is also a case where the response wavelength degeneration is observed due to the symmetry of the molecular structure and the like.

Advantageous Effect of the Disclosure

In any of the aspects of the present disclosure, the infrared spectroscopy will be achieved which can detect the substance with high sensitivity.

BRIEF DESCRIPTION OF THE DRAWINGS

FIGS. 6A and 6B are reflectance maps showing the characteristics of infrared reflectance in the structure of the embodiment of the present disclosure, which has a structure shown in FIG. 3, as a function of frequency (vertical axis) and incident angle (horizontal axis); and experimental values (FIG. 6A) and a numerical simulation result (FIG. 6B) in the example sample are shown in contrast to each other.

FIG. 8A shows the data which were measured values of the reflectance spectrum obtained from a SAM of 16-MHDA, at θ=80° on a bare Au surface (upper), and the data which were measured values at different incident angles from 30° to 70° on the metal surface of the structure (lower).

In addition, FIG. 8B is a spectral curve shape (upper) of the vibrational signals at incident angle θ=40° and the experimental result which were extracted, and a Fano fitting curve (lower) for reproducing the same curve shape using corresponding parameters.

DETAILED DESCRIPTION

Figure 1:
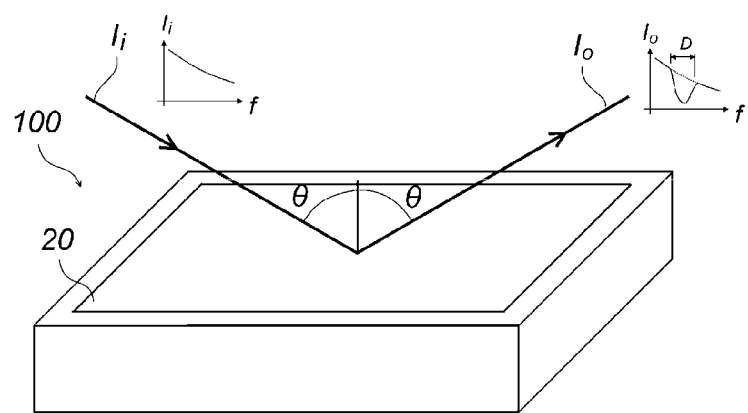
FIG. 1 is a perspective view showing a schematic configuration of a structure for typical infrared spectroscopy in an embodiment of the present disclosure.

The structures for use in the infrared spectroscopy according to the present disclosure and the embodiments of the infrared spectroscopy using the structures will be described below. Common portions or elements will be denoted by common reference characters, unless otherwise particularly referred to in the description. In addition, in the figures, each of the elements in each embodiment is not necessarily shown to scale.

1. Infrared Spectroscopy Using Infrared Ray Absorption Surface

In the present embodiment, an infrared ray absorption surface is used for the infrared spectroscopy. The infrared ray absorption surface can be achieved based on a metamaterial technique. The types thereof are: a metal substrate having a metal surface; metal components that are disposed at positions facing the metal surface; and a surface of the structure having a support part which supports each of the metal components relative to the metal surface. In this structure, the metal substrate, the metal components, and the support part form a resonator that exhibits resonance to thereby achieve the infrared ray absorption.

FIG. 1 is a perspective view showing a schematic configuration of a structure 100 (hereinafter referred to as "structure 100") for typical infrared spectroscopy of the present embodiment. The structure 100 has an infrared ray absorption surface 20. The infrared ray absorption surface 20 is manufactured so as to absorb at least infrared rays in a detection wavelength range covering a response wavelength of a substance to become an object to be detected (substance to be detected) to some extent, in other words, so as to have a dip D on the reflection spectrum. The substance to be detected is included in a specimen (not shown), and the specimen is disposed so as to come into close contact with the infrared ray absorption surface 20. The infrared rays $I_i$ incident on the structure 100 are generally incident on the infrared ray absorption surface 20 at a predetermined incident angle θ. At the time when the infrared rays $I_i$ are emitted, the specimen attaches to or is adsorbed on the surface of the infrared ray absorption surface 20 of the structure 100. In the structure 100 itself and the space facing the infrared ray absorption surface 20, ambient conditions such as an atmosphere (type of gas, and pressure) and temperature are appropriately arranged as needed. The incident infrared ray $I_i$ is an infrared beam that is provided through an appropriate light source or optics (not shown), and the specularly reflected reflection light $I_o$ is detected by an appropriate light receiving optics or detector. Wavelength resolution for determining the intensity spectrum is achieved by physical means or calculation means, for the incident infrared rays $I_i$ beforehand or for the reflection light $I_o$ afterwards. In one example, the wavelengths of the infrared rays $I_i$ are resolved by a diffraction grating beforehand, and then the resolved infrared rays irradiate the infrared ray absorption surface 20. Another technique is a technique of using the FT-IR spectroscopy, which includes: dividing the reflection light $I_o$ reflected from the infrared ray absorption surface 20 into two arms by an interference optics; making the light of one arm interfere with the light of the other arm while scanning the optical path length of the one arm; and acquiring the intensity spectrum as a power spectrum by autocorrelation. In such an infrared ray absorption surface 20, the structure 100 itself functions as a metamaterial absorber (or a metasurface absorption surface), and brings the dip D to the detected infrared reflection spectrum.

Figure 2A:
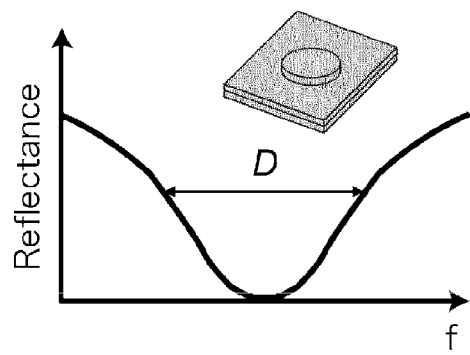
FIGS. 2A, 2B and 2C are explanatory views each showing a principle of the infrared spectroscopy by an intensity spectrum, in the embodiment of the present disclosure.
Figure 2B:
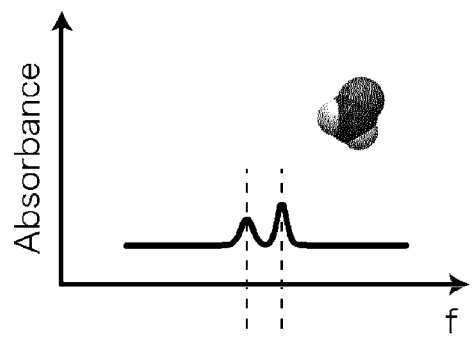
Figure 2C:
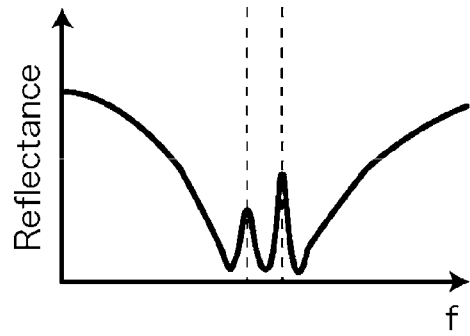

FIG. 2 is an explanatory view showing a principle of infrared spectroscopy in the present embodiment, by the intensity spectrum. FIGS. 2A and 2B are schematic views of the reflection spectrum on the infrared ray absorption surface 20 of the structure 100, and a schematic view of an absorption spectrum of the substance to be detected that can be contained in the specimen, respectively. Furthermore, FIG. 2C shows a reflection spectrum of the infrared rays reflected on the infrared ray absorption surface 20, when the specimen containing the substance to be detected exists so as to come into close contact with the infrared ray absorption surface 20. Abscissa axes of each graph are made to match with each other. In general, the resonance occurs between light and the structure on the infrared ray absorption surface, thereby the localization of the electromagnetic energy corresponding to the Q value is achieved. The dip D of the reflectance on the infrared ray absorption surface due to the metamaterial absorber, or the detection wavelength range, becomes to have a relatively wide width in wavelength, as compared with the narrow spectral line width in the vicinity of the response wavelength of the substance to be detected. Thus, in the typical measurement of the present embodiment, the response wavelength of the substance to be detected can be included in the detection wavelength range which becomes a low background. The detection wavelength range is observed as the dip D (FIG. 2A) in which the reflectance of the infrared ray absorption surface 20 is suppressed, while covering at least one of the response wavelengths of the substance to be detected. The dip D in the reflection spectrum directly gives the detection wavelength range, and accordingly is hereafter referred to also as the detection wavelength range D by the same reference character. When the specimen containing the substance to be detected exists so as to come into close contact with the infrared ray absorption surface 20, a peak is observed at the same or substantially the same wavelength, in the reflection spectrum (FIG. 2C), as the response wavelength (FIG. 2B) of the substance to be detected. Since this peak can be explained by Fano's theory that describes an interaction between a plurality of resonance phenomena, as will be described later in examples, it is considered that such interaction should be found for two resonances; one is resonance responsible for the absorption in the infrared ray absorption surface 20 (resonance between light and structure), and the other is one originated in the molecular vibrations at the response wavelength of the substance to be detected (resonance between light and molecular vibration). In the detection wavelength range D, the background light is suppressed, which improves sensitivity further. Therefore, the technique of the present embodiment is an attractive approach for acquiring a significant signal-to-noise ratio. The reflectance on the infrared ray absorption surface 20 in the wavelength region deviating from the detection wavelength range D is not particularly limited. Such a phenomenon is achieved when the specimen comes into close contact with the infrared ray absorption surface 20, and the substance to be detected in the specimen also comes into close contact with the infrared ray absorption surface 20. A typical example is the case where the substance to be detected microscopically comes into contact with the infrared ray absorption surface 20, for instance, by chemical adsorption or physical adsorption. However, as long as the peak is observed as has been described in FIG. 2C, the form and the distance of the close contact between the substance to be detected and the infrared ray absorption surface 20 are not limited in the present embodiment.

It is to be noted, in the conventional technique, that absorption by the substance to be detected may be measured in transmitted or reflected infrared rays. Absorption originates in phenomenon in which energy is transferred from the emitted infrared rays to the molecular vibrations of the substance to be detected. This principle also holds for conventional SEIRA, which attempts to increase the interaction between light and the substance to be detected, by hot-spot engineering which locally enhances the electric field and the magnetic field on the surface of the reflection plane, and to enhance the measurement sensitivity for the absorption by the molecular vibrations. Accordingly, in any case, the conventional technique attempts to find absorption in signals of comparatively strong background light. Thus, as far as the conventional technique is concerned, such a tendency is common that as the content of the substance to be detected decreases, the absorption signal tends to be buried because of a strong background. Furthermore, it can be assumed that the peak shown in FIG. 2C does not occur even though the knowledge of the ordinary infrared spectroscopy has been simply applied to the situation in FIG. 2. Even if the molecular vibration of the substance to be detected has shown the absorption as in FIG. 2B based on the resonance between the light and the molecular vibration, factors that may be responsible for is merely absorption phenomena occurred in a multiple manner.

2. Elements of Structure for Achieving Infrared Ray Absorption Surface

Figure 3A:
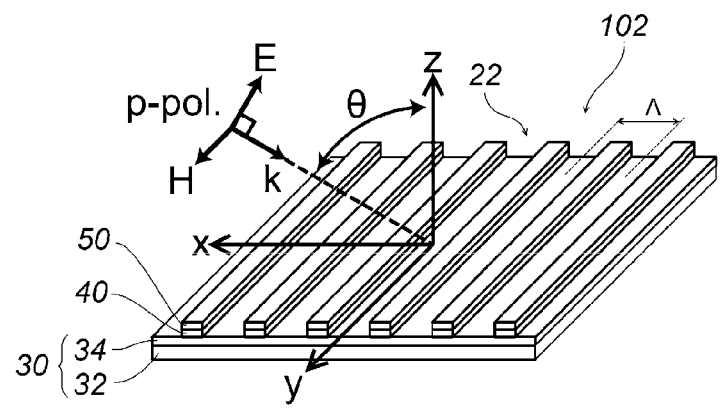
FIGS. 3A and 3B are schematic views each illustrating a structure of a metamaterial infrared absorber having linear ribs, which is a typical example of the embodiment of the present disclosure; and are a perspective view (FIG. 3A) showing a whole structure and an enlarged sectional view (FIG. 3B) showing only one unit of individual ribbons having a repeating structure.
Figure 3B:
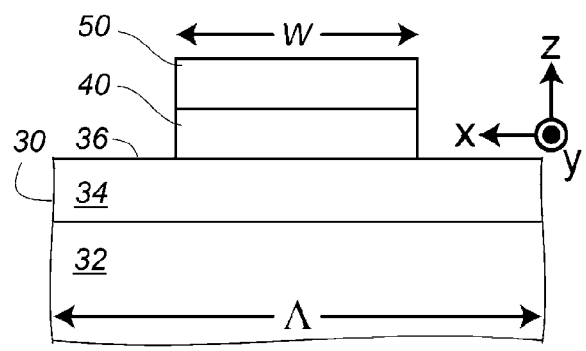

In the present embodiment, various types are considered as such a structure of the structure 100 as to achieve the infrared ray absorption surface 20 of FIG. 1, and one typical example is a structure in which a large number of ribbons having a metal-insulator-metal (MIM) layered structure are repeatedly aligned so as to form linear ribs of a one-dimensional array. FIGS. 3A and 3B are views that show a structure 102, which is one typical example of the structure 100 and is a metamaterial infrared absorber having linear ribs; and are a perspective view (FIG. 3A) showing a whole structure of the linear ribs, and an enlarged cross-sectional view (FIG. 3B) showing only one unit of individual ribbons which have a repeating structure and have each the MIM layered structure. As is shown in FIG. 3B, the structure 102 has a metal substrate 30 which has a thick Au film, and a metal component 50 which is an Au micro-ribbon existing above the metal substrate 30; and the metal substrate 30 and the metal component 50 are separated from each other by a support part 40 which is a $MgF_2$ gap layer. The structure 102 has an infrared ray absorption surface 22 which has unit cells having such an MIM layered structure. The metal substrate 30 has such a structure as to have the metal layer 34 formed on one surface of an appropriate substrate 32, for instance, of glass or the like, so as to have an enough thickness which is thicker than a skin-depth and can neglect transmission (for instance, if the metal layer is made of gold, 2 μm or thicker even in the case of long wavelength); and the metal layer 34 has the metal surface 36 as its surface. The metal layer 34 may be a single metal layer having a single composition, a composite layer having different compositions, an alloy layer or the like. The whole metal substrate 30 may be formed of a metal foil or a metal plate, and thereby may have the metal surface 36 formed thereon.

The condition to be regarded as the metal surface 36 of the present embodiment is that the surface is made from such a material as to have a sufficient amount of carriers responsible for the conduction of free electrons and the like, and easily respond to the electromagnetic field of the infrared rays in the detection wavelength range, in other words, as to exhibit a metallic behavior. As long as the condition is satisfied, the outermost surface of the layer of an arbitrary material and thickness can be used as the metal surface 36. Preferably, metal including at least any of the metal group consisting of gold, silver, copper, aluminum and platinum is used for the metal surface. Specifically, the typical metal surface 36 is the outermost surface of an ordinary metal (for instance, gold) which has reflectivity shown by the ordinary metal and absorbs incident energy that has not been reflected. In general, materials which are not classified as metal can be used for the metal surface 36 of the present embodiment, if the surface is made from a material (for instance, semiconductor doped with impurities, in particular, degenerated semiconductor or the like) which exhibits a metallic behavior in the detection wavelength range out of the infrared region, as long as the material is suitable in the used wavelength region.

The metal component 50 is disposed at a position facing the metal surface 36 when viewed from the metal substrate 30. The metal components 50 typically form an array that occupies positions on facing portions of the metal surface 36. The material of the metal component 50 may be the same material as the material for the metal surface 36 or may be a different material therefrom. In addition, the metal component 50 can be also made from a material that exhibits metallic behavior in the detection wavelength range out of the infrared range. In the case where linear ribs are used which are ribbons arranged as in the structure 102, a period Λ and a width w are adjusted so that the detection wavelength range D covers the reaction wavelength of the substance to be detected. Specifically, the material of the metal component 50 is an arbitrary metal that easily makes a metamaterial absorber in the detection wavelength range D, and is preferably a metal including at least any one selected from the metal group consisting of gold, silver, copper, aluminum, and platinum.

The support part 40 supports the metal component 50 so that the metal component 50 is positioned away from the metal substrate 30. The individual ribs are ribbons that form the MIM layered structure together with the metal substrate 30. However, the support part 40 does not necessarily need to have the same plane shape as that of the metal component 50. A typical material of the support part 40 is $MgF_2$. In addition to MgF$_2$, a glassy inorganic film can also be adopted. The support part 40 forms typically a linear rib similar to the metal component 50 as in FIG. 3A. The support part 40 which has adopted MgF$_2$ of the present embodiment shows a small absorbance for and has transparency for the infrared rays, and plays a role of adjusting an electrical coupling between the metal component 50 and the metal substrate 30, through its dielectric characteristics. More generally, the function carried out by the support part 40 is at least to support the metal component 50 above the metal substrate 30; and to electrically couple both of the substrate and the component in order to form the structure, and to allow the infrared rays in the wavelength region of interest to pass therethrough. The material and thickness of the support part 40 which determines the electrostatic capacitance between the metal component 50 and the metal substrate 30 are adjusted so that the detection wavelength range D (FIG. 2A) suitable for the substance to be detected can be obtained. Between the metal component 50 and the metal substrate 30 which the support part 40 electrostatically couples, a phase difference is produced between both electric polarizations in the metal component 50 and the metal substrate 30 with a phase delay (retardation effect) due to an the thickness effect of the support part 40, which suppresses the reflected infrared rays generation, making the incident infrared rays efficiently absorbed in the metal substrate 30. In this way, it is possible to implement the structure 102 of a metamaterial absorber having an MIM layered structure with designated detection wavelength range D.

In addition to the above described typical example, such an arbitrary element can be adopted for the infrared ray absorption surface 20 of the present embodiment as to be capable of achieving an appropriate detection wavelength range D including the response wavelength of the target substance to be detected, by tailoring the shapes of the cross section and the flat surface and the layer configuration. Another typical example of the cross-sectional configuration is a configuration in which the whole surface of the metal surface 36 is covered with a film that adopts such a material as to allow the infrared rays to pass therethrough such as MgF$_2$, and only the metal component 50 is patterned. In addition, another preferable example of the flat surface configuration has such a configuration as to have a cross section of the MIM layered structure of FIG. 3B, and to have rectangular island-shaped elements having gaps not only in the x-direction but also the y-direction, or a circular shape. Alternatively, it is also possible to adopt a configuration in which the relationship of the patterns of these existing sea and islands is interchanged (i.e., negative/positive pattern inversion), when arranging an array of rectangular or circular openings. In a flat surface shape having a two-dimensional shape such as an island-shaped element or opening, the alignment of the lattice shape that individual elements form and the size of individual patterns are adjusted. Also, a covering ratio of how large area is covered with the metal component 50 out of the area of the metal surface 36 is adjusted. These adjustments are made so as to make detection wavelength range D appropriate.

The metal component 50 can be manufactured preferably by patterning the metal film. The patterning technique is not particularly limited, and an arbitrary manufacturing technique including other configurations than the linear ribs pattern may be adopted. For instance, techniques such as photolithography and electron beam lithography can be adopted. It should be noted that the patterning of the metal film includes not only a technique of forming the metal film on a flat plane and then partially removing the metal film, but also a technique of partially forming the metal film in a positional selective manner (for instance, pattern deposition). Also, what may be adopted is a technique of patterning a resist film or the like, which works as a mask and removing the resist film, such as liftoff, to thereby form also a pattern of the metal film. Furthermore, the metal component 50 does not necessarily need to use the metal film in order to tailor the detection wavelength range according to the substance to be detected. For instance, it is also preferable to manufacture a large number of metal components for arranging them into an intended arrangement by combining fine components such as metallic microspheres through a self-assembling action to create metal components acting as individual units, without using a lithographic process or with using the lithographic process in an auxiliary way.

In the structure 102 which has been manufactured as in the above description, the plasmonic mode is excited as a result of the resonance between the light and the structure. If the structure of the metal component 50 and the support part 40 is not manufactured, and if only the metal substrate 30 is used, most of the infrared rays incident on the metal surface are reflected, and a small remainder should be absorbed by the metal. On the other hand, in the structure 102, the metal component 50 and the support part 40 having such appropriate shapes as to fit the detection wavelength range are provided. As a result, the energy of the infrared rays incident at the frequency of the detection wavelength range is localized in a form of the plasmonic mode in the vicinity of the metal surface 36, due to the electromagnetic resonance among the Au/MgF$_2$/Au structure, or among a structure of the metal component 50, the support part 40, and the metal substrate 30. The energy impinging into the metal surface 36 in a form of the infrared rays in the detection wavelength range D excites this mode, and is transmitted into and absorbed by the media of the metal substrate 30 without being reflected, which results in the suppressed reflection by the metal substrate 30. When such an infrared ray absorption surface is adopted as to have the structure embodying the metamaterial absorber of the present embodiment, the infrared ray absorption surface keeps the signal-to-noise ratio significant in the far field measurement, achieves the sensitivity at the attomole level, and can lower the detection limit of direct infrared absorption spectroscopy. In addition, as will be described as relating matters in the examples, an infrared detection technique sensitive to an extremely small amount of molecules is achieved through the unique ambient condition of the surface of the structure 102. At this time, since the sensitivity is improved due to its low background, the strong absorption of the structure 102 of the metamaterial absorber is distinguished in a form of a distinctive anti-resonance peak in the detection wavelength range D, which allows vibrational signal to be detected.

3. Analysis Processing by Infrared Spectroscopy

Figure 4:
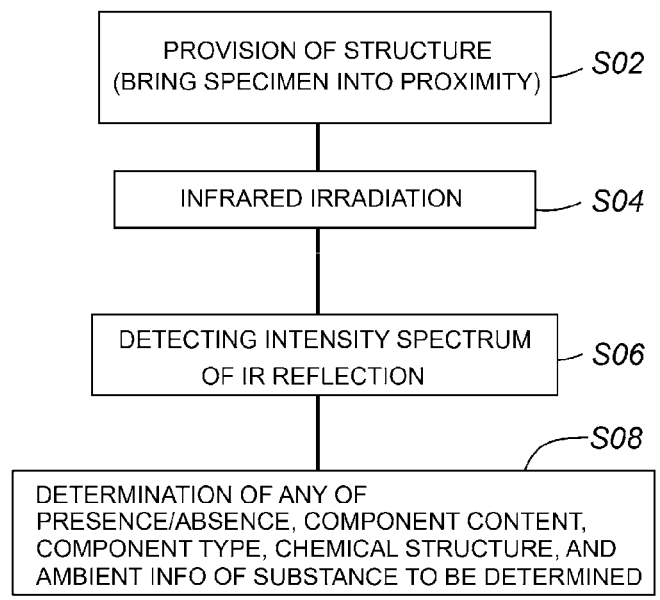
FIG. 4 is a flowchart showing analysis processing by the infrared spectroscopy in the embodiment of the present disclosure.

FIG. 4 is a flowchart showing analysis processing by infrared spectroscopy according to the present embodiment. In the infrared spectroscopy of the present embodiment, firstly, the above described structure is provided (S02). The specimen to be analyzed comes into close contact with the infrared ray absorption surface 20 of the structure. There is a case where the specimen for the infrared ray absorption surface 20 is provided after the specimen has been brought into close contact with the surface beforehand, and is a case where the specimen is supplied to the infrared ray absorption surface or is exchanged, in the middle of the processing of the analysis by infrared spectroscopy. Then, the infrared ray absorption surface 20 is irradiated with the infrared rays in the wavelength range covering at least the response wavelength which the substance to be detected shows (S04), and the intensity spectrum of infrared rays reflected from the infrared ray absorption surface 20 is detected (S06).

The irradiation step (S04) is typically a step of irradiating the infrared ray absorption surface 20 with the infrared rays from an incidence direction inclined to the surface. Furthermore, in the detecting step (S06), the intensity of the reflected infrared rays is detected in the specular reflection direction on the infrared ray absorption surface. In addition, another typical of the irradiating step (S04) is to emit the infrared rays of polarized light whose absorption is significant on the infrared ray absorption surface.

In addition to the above described processing (S02 to S06), a determination step (S08) can also be further carried out which determines at least any one of the presence/absence, the component content, the type, the chemical structure, and the ambient information regarding the substance to be detected in the specimen, on the basis of the reflection peak corresponding to the substance to be detected found in the intensity spectrum of the reflected infrared rays. At this time, a comparison using databases such as known substances and known chemical bonds may also be carried out as needed.

4. Example

Figure 5A:
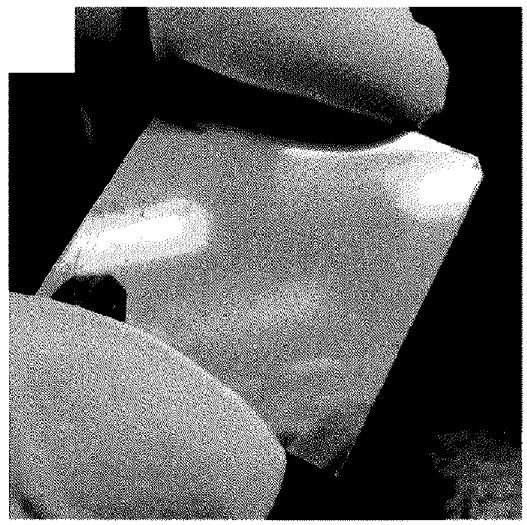
FIGS. 5A and 5B are an external photograph (FIG. 5A) and an SEM image (FIG. 5B) of an example sample of a structure, which is a metamaterial absorber that has been manufactured in an example of the embodiment of the present disclosure.
Figure 5B:
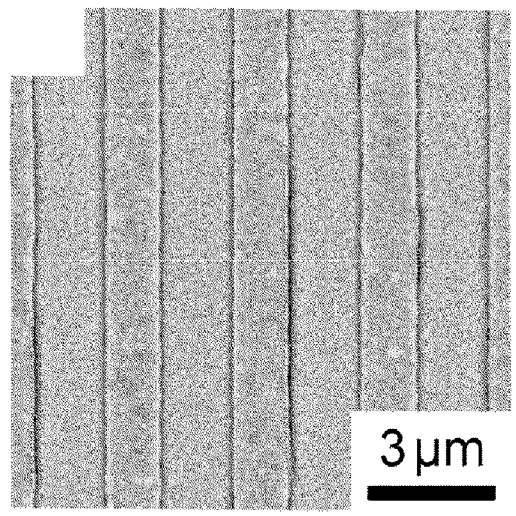

The present disclosure will be described more specifically with reference to examples. Materials, amounts to be used, rates, contents of treatment, treatment procedures and directions, specific arrangements of elements or members and the like, which will be described in the following examples, can be suitably changed unless they deviate from the scope of the present disclosure. Accordingly, the scope of the present disclosure is not limited to the following specific examples. An example sample of the structure 102 (FIG. 3) was actually manufactured in which the detection wavelength range D (FIG. 2) was set in the wavelength region which was centered on approximately 3000 cm$^{-1}$. In the step, for the metal substrate 30, firstly, a thin film of gold with a thickness of 200 nm was vapor-deposited on an $SiO_2$ substrate provided with a bonding layer of 5 nm thick Cr, by electron beam heating. Subsequently, for the purpose of forming the support part 40 and the metal component 50, an array of one-dimensional (1D) micro-ribbons was patterned on the Au film surface by a standard photolithography process. Specifically, a surface structure was obtained through vapor deposition of thin films of 30 nm $MgF_2$ and 50 nm gold and a lift-off process. FIG. 5 is an appearance photograph (FIG. 5A) and an SEM image (FIG. 5B) of an example sample of the structure 102 which is a manufactured metamaterial absorber. In the manufactured example sample, a uniform surface structure was obtained over the whole surface of the chip having as wide an area as 26×26 mm$^2$. It should be noted that the detection wavelength range centered on approximately 3000 cm$^{-1}$ has an overlapping spectra with C—H stretching modes.

The infrared absorption characteristics by the example sample of the manufactured structure 102 were measured. P-polarized light was used as the irradiated infrared rays, the incident angle θ was changed, and the reflection spectrum was measured by using Fourier-transformed infrared spectrometer (FT-IR, JASCO, FT/IR-6300 FV) provided with a variable angle reflection accessory (Harrick, Seagull). The optical path arrangement in the measurement is shown in FIG. 3A. In order to improve the signal-to-noise ratio of the infrared detection signal, inside of the sample container was purged by dry nitrogen gas, and a high sensitivity MCT (HgCdTe) detector which was cooled by liquid nitrogen was used at a wavenumber resolution of 2 cm$^{-1}$. The metal layer 34 on the substrate 32 is a thick film of gold, which is thicker than the skin thickness, and through which the infrared rays do not transmit, and accordingly the incident infrared ray beam is either reflected or absorbed by the surface structure. If the plasmon mode is excited, the absorption dip appears in the reflection spectrum due to the resonant action.

FIGS. 6A and 6B are reflectance maps showing the characteristics of the infrared absorption of the structure 102 of the structure shown in FIG. 3, as a function of frequency (or wavenumber; vertical axis) and an incident angle (horizontal axis); and show the experimental values (FIG. 6A) by the example sample and a numerical simulation result (FIG. 6B) on the same condition as the example sample, in a side-by-side manner. These reflectance values are obtained after having been normalized by values obtained on an Au reference sample. As shown in FIG. 6A, a shallow valley due to several weak absorptions that depend on incident angles and a deep valley due to three major absorptions which are the absorptions of almost 100% were clearly observed at 1000 cm$^{-1}$ to 5000 cm$^{-1}$ (f=30 THz to 150 THz). FIG. 6B shows the result of a series of numerical simulations carried out by using the finite element method (FEM) in order to identify the plasmon mode which becomes the cause of these absorptions. In the calculation, the refractive index of $SiO_2$ was set at 1.45, and the experimental values were used for Au and $MgF_2$. In the simulation result of FIG. 6B, the excited plasmon modes are clearly shown by curves of chain lines, which distinguish the resonance mode (m) from the surface plasmon polaritons (SPPs) that are phenomena other than the original intent.

In the reflectance map (FIG. 6B) by numerical simulation, the experimental results shown in FIG. 6A were satisfactorily reproduced in both qualitative and quantitative aspects. It can be said that weak absorptions occurred due to Fabry-Perot resonances in surface plasmon polaritons (SPPs) propagating on the metamaterial surface of linear ribs, which is a one-dimensional periodic surface structure. Specifically, the dispersion relation generally satisfies the momentum conservation law of SPP excitation, in other words, the relation of $(w/c)\sin \theta = (\pi/\Lambda)l$ (ω is angular frequency, c is the speed of light, and l is an integer). On the other hand, the frequencies of the principal absorptions each labeled as m=1, m=2 and m=3 are irrelevant to the incident angle and originate in plasmon resonance localized in $Au/MgF_2/Au$ structure. In this way, it was confirmed that the surface of the example sample which was actually manufactured structure 102 that was an array of the linear ribs of the $Au/MgF_2/Au$ structure which the metal component 50, the support part 40 and the metal substrate 30 form, actually worked as the metamaterial absorber for the infrared ray absorption surface 20.

Figure 7:
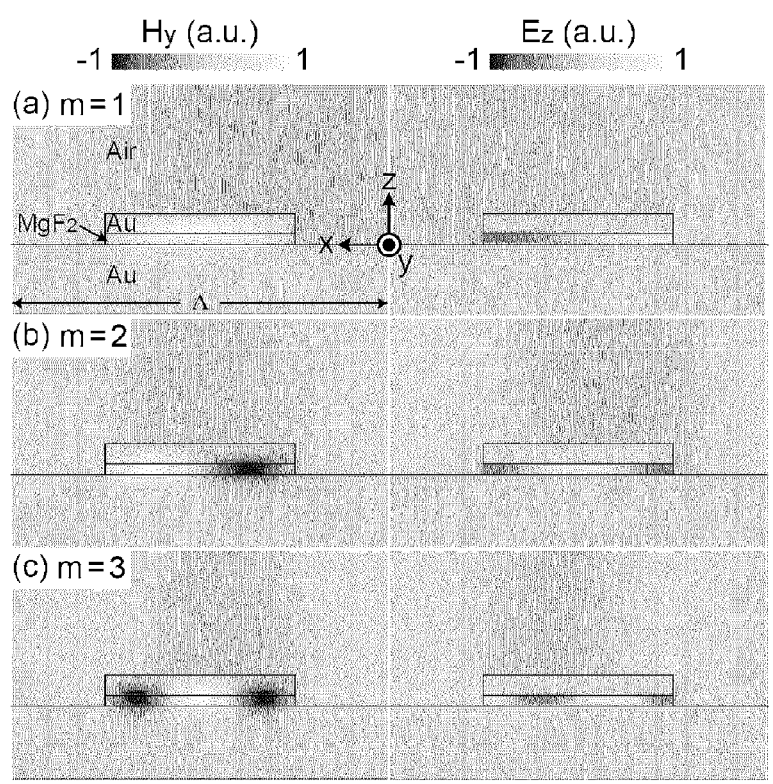
FIG. 7 shows calculation results of the electromagnetic field distribution of each mode in the example sample of the present disclosure.

Next, the electromagnetic field distributions ($H_y$ and $E_z$) of each mode based on the calculation are shown in FIG. 7. Each mode corresponds to major absorption dips at θ=80° in FIG. 6B, respectively, and corresponds to m=1 at 1540 cm$^{-1}$, m=2 at 3013.3 cm$^{-1}$, and m=3 at 4476.6 cm$^{-1}$, in order from FIGS. 7A to 7C. For the sake of the description, all the figures are enlarged 3 times in the vertical direction. In correspondence with the incident p-polarized light, the localized plasmon in which a direction of the dipole is directed to a width direction of the ribbon is resonantly excited in the metal component 50 that is the upper Au ribbon. The localized plasmon of the metal component 50 induces its mirror image inside the metal substrate 30 which is a thick Au film, and accordingly these images interact with each other to generate plasmon hybridization. As a result, two new specific modes which are symmetric and asymmetric modes are formed. However, the symmetric mode is naturally prohibited because of the parity due to mirror image interaction, and accordingly only the asymmetric mode is selectively excited in this system. The asymmetric mode that is referred to as a so-called magnetic mode relates to the charge oscillation of opposite phase. Therefore, the incident and re-radiated lights interfere destructively with each other, which leads to effective cancelling out of the reflection light. This physics in the metamaterial absorber suppresses undesirable light reflection from the gold surface, and causes strong light absorption.

The net electric dipole moment of the above described magnetic mode becomes zero in the quasistatic limit, and accordingly the mode excitation efficiency naturally decreases and strongly depends on the retardation originating in oblique incidence. In the case of m=2 (FIG. 7B), the electric field distribution is symmetrical as a whole across the center of the metal component 50 which becomes the surface structure, and accordingly such a mode cannot be ideally excited in the vertically incident light (dark mode). However, in the above mode, as the incident angle increases, the mode is progressively excited due to the symmetry breaking in the x-axis direction, and the dip of the absorption becomes clear at θ>30° (FIG. 6). A similar situation is observed in the case of m=3, and the retardation effects cancel each other due to the profile of the asymmetric mode, and the mode is not exited at an incident angle of 40° in particular.

Furthermore, in order to confirm the actual trace detecting capability of the infrared ray absorption surface which achieves both of the tailored plasmonic enhancement and the significant suppression of the background, the resonant coupling was checked by an experiment that adopts the infrared vibrational mode of molecular self-assembled monolayer (molecular SAM) of the molecular level as a coupling counterpart. Specifically, the resonant coupling between the plasmonic mode of the structure 102 and the molecular SAM was checked in the experiment.

Figures 8A, 8B:
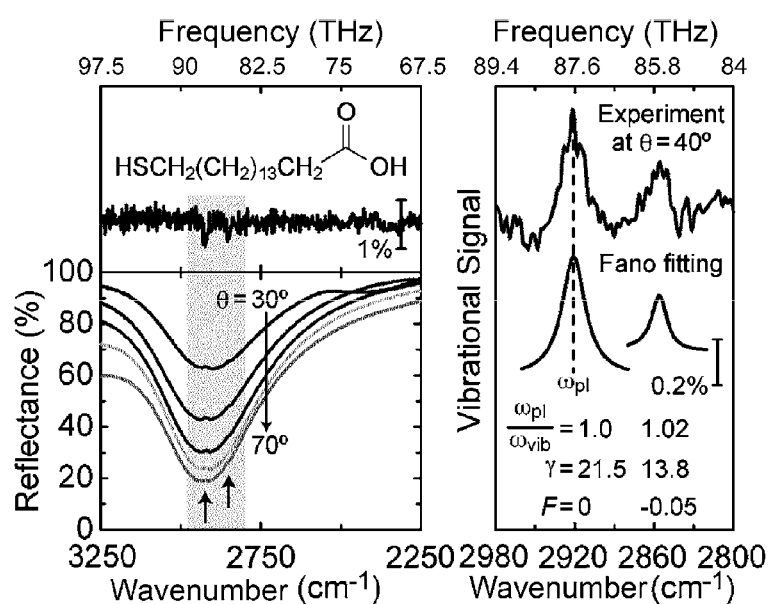
FIGS. 8A and 8B are graphs that illustrate actually measured data which were obtained in the example sample of the present disclosure.

FIG. 8A shows measured values of reflectance spectrum obtained from SAM of 16-MHDA; and shows in order from the upper to the lower, the measured values obtained at θ=80° on a bare Au surface, and measured values obtained at different incident angles of 30° to 70° on the metal surface 36 of the structure 102. As for the target molecules showing typical symmetric and asymmetric C—H stretching vibrational modes at approximately 2855 cm$^{-1}$ and 2920 cm$^{-1}$, the 16-Mercaptohexadecanoic acid (16-MHDA, made by Shigma-Aldrich) depicted in the inset of FIG. 8A was adopted. The mode of m=2 in the metamaterial absorber of the structure 102 is used for a mode that forms a plasmon-molecule coupling system. This is because the above mode of m=2 overlaps the above described symmetric and asymmetric C—H stretching vibrational modes in the spectrum, and it is appropriate to set the absorption band in the mode of m=2 as the detection wavelength range covering the response wavelength of the above described target molecule, or the substance to be detected. The layer of the molecular SAM was prepared by using the self-assembling capability which 16-MHDA has. As for a specific process, it was determined that, firstly, the structure 102 was immersed in a 16-MHDA ethanol solution of 10$^{-3}$ M. After 48 hours, the sample was washed with ethanol and dried with dry nitrogen gas to complete the preparation of an object to be measured.

Due to this process, the thiol head group was chemisorbed onto the Au surface, and the whole of the structure 102 was covered with SAM of the 16-MHDA having a thickness of 21.5 Angstrom (2.15 nm). As a reference measurement for a control, a comparative example sample (bare Au sample) was prepared with the metal substrate 30 of Au by adopting neither the support part 40 nor the support part 40 while subjecting it to the same process.

It is to be noted in the upper part of FIG. 8A that the vertical axis indicates a bright range where the reflectance of gold appears, and the bar of 1 shows a range from 98% to 99%. In the case of the bare Au sample, signals accompanied by fluctuation are obtained, and it is helpful to identify a weak absorption spectrum from among the noises due to the fluctuation. It follows that such an operation suffers from an extremely low signal to noise ratio, and that it leads a great difficulty in detecting each absorption dip in the C—H stretching mode and determining the wavelength. On the other hand, in the example sample of the structure 102 in the lower part of FIG. 8A, Fano-like anti-resonance peaks (indicated by upward arrow in the figure) are generated as a result of resonant coupling between the plasmonic mode and the molecular vibrational mode. Specifically, the structure 102 shows a wide plasmonic absorption which becomes the detection wavelength range, at the position of $\omega_{pl}$=2921.9 cm$^{-1}$. The dip of the absorption became clearer as the increase of the incident angle θ. Furthermore, the vibrational mode of the molecules in the vicinity of the metal surface 36 of the structure 102 resonantly coupled with the plasmonic mode of the structure 102. Peaks generated in the wide absorption of the metamaterial are two Fano-like anti-resonance peaks which are distinguished from each other, and this absorption coupling process was dependent on the incident angle. The clear vibration signal was not obtained when the incident angle range was θ<30° or θ>70°, and the signal intensity became maximum in the vicinity of θ=40°. Concerning this reason, the inventors consider that in the case of θ<30°, the excitation of the plasmonic mode of the structure 102 has been too weak to detect the anti-resonance peak; and that on the other hand, in the case of θ>70°, the molecular vibrational mode has been directly excited by incident infrared light, thereby the absorption has increased, the competition has occurred between the peak caused by the resonant coupling process and the above absorption, and as a result, the signal has become weak.

The net value (vibrational signal) that excited the molecular vibration can be extracted by performing a baseline correction of dividing the measured reflection spectrum by the curve shape obtained by plasmon resonance. The upper part of FIG. 8B shows thus extracted vibrational signals at the incident angle θ=40°. Each vibrational signal in symmetric/asymmetric C—H stretching modes was clearly observed. This result illustrates our primary target of achieving metamaterial-enhanced infrared absorption spectroscopy.

In order to quantitatively analyze the vibrational signal, Fano curve-shape fitting was also performed according to the following functional form of Formula 1 below:

$$I \propto \frac{(\omega - \omega_{vib} + F\gamma)}{(\omega - \omega_{vib})^2 + \gamma^2} \qquad \text{Formula (1)}$$

In Formula 1, $\omega_{vib}$ is a resonant frequency, γ a damping constant (FWHM), and F a Fano parameter for describing the degree of asymmetry. The spectral curve shape of the experimental results was satisfactorily reproduced by a Fano fitting curve using corresponding parameters (lower part of FIG. 8B). The $\omega_{pt}/\omega_{vib}$ is detuning. The central frequency of the fitting curve shows good coincidence with that of the symmetric/asymmetric C—H stretching mode, and the fitting curve could substantially accurately identify the specific functional group. Due to the property of the Fano resonance, the fitting curve was clearly changed from a symmetrical curve shape (F=0) to an asymmetric one (F=−0.05) while being accompanied by frequency detuning between the plasmon resonance and the molecular vibration. By using a SAM packing density of 21.4 angstrom$^2$/molecule (0.214 nm$^2$/molecule), the sensitivity in the case of the infrared ray beam spot under the diffraction limit in FT-IR reflection measurement is estimated, and the value was determined to be approximately 1.8 attomoles.

As has been described above, a new spectroscopic technique based on the metamaterial enhanced infrared absorption of the molecular SAM was proposed and demonstrated. A low background detection technique was demonstrated which was attended with the tailored plasmonic resonance by a metamaterial absorber such as the structure 102, and the sensitivity of the attomole level was achieved in direct infrared absorption spectroscopy. A noteworthy fact in the present embodiment is that a sensitivity of the attomole ($10^{-18}$ moles) level was achieved at the high signal-to-noise ratio in the far-field measurement. In the principle as well, we confirmed that the resonant interference of the plasmon-molecule coupling system which becomes the cause actually occurred, through a spectrum analysis using the Fano curve-shape fitting. This result shows a direct evidence of a fact that in addition to the resonance between the light and the structure, the resonance between light and molecular vibration actually occurs, and that both resonances interact with each other. The low background originating in the above interaction and the peak at the reaction wavelength in the background bring a new principle to the infrared spectroscopy, open a way to an ultra-sensitive infrared inspection technology, and can be an evidence that the technique using the metamaterial of the present embodiment can be new means of achieving the ultra-sensitive infrared inspection technology.

5. Modified Example

The present embodiment of which the possibility has been checked in the above described example can be also implemented after having received various modifications as will be described below.

5-1. Modification of Linear Rib Structure

The structure of the present embodiment can be modified in order to adjust the wavelength region and the wavelength width for the detection wavelength range, or to adjust the angle at which the peak becomes most clear that originates in the molecular vibration of the substance to be detected, among the incident angles (FIG. 1, θ) of the infrared rays. In the case where the structure 102 is adopted in which the metal component 50 is a linear rib structure as shown in FIG. 3, the detection wavelength range by the plasmonic absorption can be changed shorter by shortening the period Λ. Also as for the support part 40, various structures other than the above described support part 40 can be adopted as long as the support part supports the metal component 50 relative to the metal substrate 30. For instance, the structure of the support part 40, which is configured to cover the whole surface of the metal substrate 30 so as to support the metal component 50, can be said to be advantageous in a point that it is easy to manufacture. The distance separating the metal component 50 from the metal substrate 30 affects the detection wavelength range. The wavelength region and the wavelength width of this detection wavelength range can be easily adjusted by the thickness of the support part 40, and the like.

5-2. Modification of Resonator

Figure 9A:
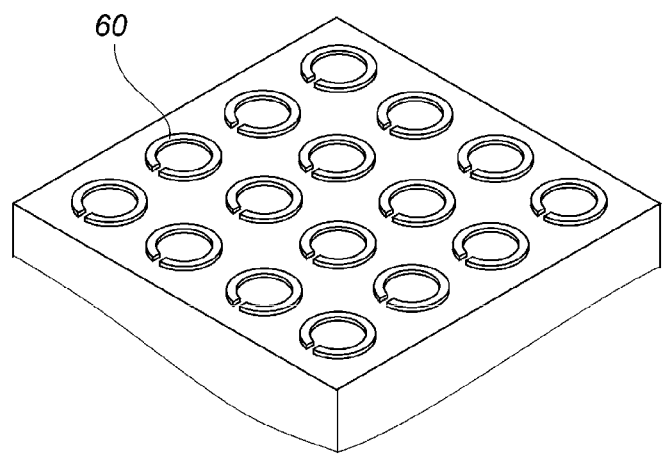
FIGS. 9A and 9B are perspective views illustrating another infrared ray absorption surface according to the embodiment of the present disclosure; and are an example in which an array of SSRRs is formed for the infrared ray absorption surface (FIG. 9A), and an example in which an array of 3D-SRR is formed (FIG. 9B).

In the new infrared spectroscopy by the inventors, in addition to the above described adjustment of size and selection of material, a device structure, a designing method and the manufacturing process which have been described in the prior report by the present inventors can be also adopted, for the purpose of performing the concept of the present disclosure. For instance, preferable examples in the present embodiment include: the metal component 50 that forms a ring which has a two-dimensional planar shape, and that forms a split-ring similar to a ring having a gap at least in a part in the circumferential direction (for instance a C-shape). Split-ring resonators (SRRs) such as a single split-ring resonators (SSRRs) and a double split-ring resonators (DSRRs), in particular, will exhibit sufficient performance to eliminate unnecessary noise in spectroscopic application. The reason is because the absorber having the split-ring resonator has a capability of adapting the wavelength region to a desirable one with higher accuracy, by being tailored according to our designing technique. Specifically, it is possible to use a resonator in which a metal ribbon or wiring forms a ring shape or a resonator having the above described split ring (Non-Patent Literature 4), in place of the resonator by combination of the metal component 50, the support part 40 and the metal substrate 30 in FIG. 3A. FIG. 9A shows an example in which an array of SSRR 60 is formed for the infrared ray absorption surface 20. In this array, the resonant action is achieved by mainly magnetically coupling infrared rays (light) with each SSRR 60, and the infrared ray absorption surface results in showing the absorption in the detection wavelength range. By determining the size of each part of the SSRR 60, it becomes possible to tailor the infrared ray absorption surface so as to match the target detection wavelength range for infrared rays and a polarized light to be used for measurement. Specifically, in order to adjust the resonant action of the resonator by the ring or the split ring, generally, sizes such as the inner diameter and the outer shape of the ring, and the width of the ring portion are adjusted. For the split ring, the size of the gap and further the thickness are also adjusted.

5-3. Three-Dimensional Ring

Figure 9B:
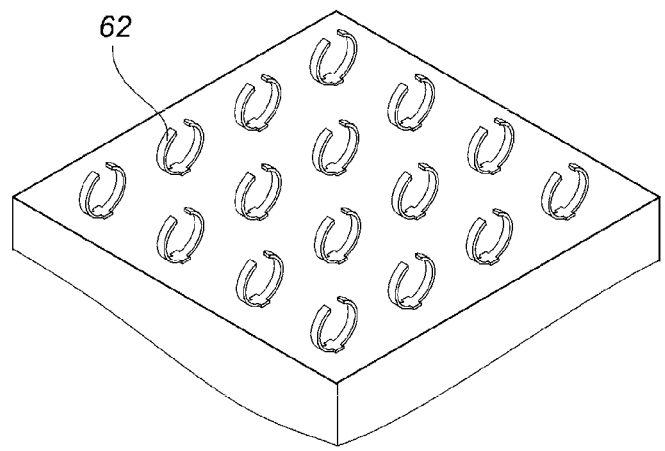

Furthermore, the split-ring resonator that can be applied to the present embodiment is not limited to only the split-ring resonator having a planar shape along the infrared ray absorption surface. For instance, a 3D-SRR (three-dimensional split-ring resonator) 62 which is shown in FIG. 9B has been proposed by the present inventors, in which each of the resonators rises from the surface including the array of the resonator, and becomes a resonator having a portion extending to a deviating direction at least in the part thereof (Non-Patent Literature 5). Such a 3D-SRR 62 can be formed from a ribbon-shaped pattern of a metal layer, which has been once patterned onto a plane by a lift-off or CF$_4$ process or the like, and by such a process (self-folding process) that the pattern is folded by itself. Such a shape and a manufacturing technique can also be an example of the structure of the present embodiment.

5-4. Modification of Metal Type

In addition, at the time when each of the above described resonators is designed, it is possible to adapt the structure of the present embodiment to the substance of interest to be detected on the basis of our theoretical approach, by tailoring the detection wavelength range in consideration of the electrical and/or magnetic response of the metal type such as Au, Ag, Cu, Al, and Pt. The present inventors have reported general effects of changing the metal material on the characteristics of the metamaterial, in the non-patent Literature 4. For instance, the inventors have analyzed the behavior of the SSRR of a type having two gaps in each ring, by correctly describing the behavior in the optical frequency region including the visible region of the metal. This analytical technique which adequately reflects the properties of the metal can also be applied to the material for the metal component 50 and the metal surface 36, and is also useful for accurately predicting other types of metamaterials such as linear ribs and the actions in the infrared region.

5-5. Candidate of Substance to be Detected

As for substances to be detected by the structure of the present embodiment, substances of various materials and properties are considered. In the above described example, 16-MHDA has been selected as the material to become the self-assembled film, but this is an exemplification for checking the feasibility of the structure of the present embodiment and infrared spectroscopy using the structure, by the substance to be detected of which the molecular number is easily estimated. In order to implement the present embodiment, the structure is adjusted to adapt the detection wavelength range to the response wavelength of the substance to be detected. In the case of implementation by the structure 102 (FIG. 3), the shapes, sizes, and materials of the metal substrate 30, the support part 40, and the metal component 50 are determined according to the substance to be detected, in consideration of modes (stretching mode, bending mode and the like, and symmetry of vibration) that will provide for the molecular vibrations to be detected.

Thus, in the present embodiment, the candidate which can be the substance to be detected is not particularly limited. In other words, arbitrary organic and inorganic substances that can be objects of infrared spectroscopy generally become substances to be detected irrespective of those physical properties. In other words, the substances to be detected are all such substances as to generate a phenomenon based on the response (for instance, molecular vibration) of the substance involved in the resonant phenomenon with the electromagnetic field, in the infrared wavelength range (far-infrared to mid-infrared region or THz wave region). Therefore, the substance to be detected includes all substances which are an object of the conventional infrared spectroscopy. There is not particular restriction on the specimen itself which potentially contains the substance to be detected. As for non-limited examples, the substances to be detected include $O_2$, HF, $CH_4$, $H_2S$, NO, $NH_3$, $CO_2$, CO, $N_2O$, $CH_4$, $H_2O$, $SO_2$, $SO_3$, $NO_2$, $SO_2$, acetone, aromatics, sugars (such as glucose), $SF_6$ and ethylene, and arbitrary known substances such as a monomer, a dimer, an oligomer, a polymer, proteins and nucleic acids, which have the response wavelengths corresponding to arbitrary vibrational modes of all the bonds contained in the substances become objects to be detected. In addition, specimens that potentially contain the substance to be detected include known substances having arbitrary properties, such as a liquid, a gas, a solid, a gel and a sol which potentially contain the substance in a part of the components. In addition, as long as the substance responds to the infrared rays, it can be said that an arbitrary substance containing an unknown substance can also be the substance to be detected.

Even when any substance to be detected becomes the object, it becomes possible to improve the sensitivity to the Zeptomole level, by optimizing the surface structure so as to increase the overlapping of the detection wavelength range given by the absorption of the infrared rays due to the plasmon mode with the response wavelength mode of the molecular vibration.

5-6. Intermediate Layer and Intermediate Space Between Infrared Ray Absorption Surface and Substance to be Detected In the present embodiment, an example has been described in which the specimen mainly comes in direct contact with the infrared ray absorption surface, but as long as the peak originating in the substance to be detected is found in the infrared reflection spectrum as described in FIG. 2, the substance to be detected does not necessarily need to come in direct contact with the infrared ray absorption surface. For instance even though any layer or space is intentionally or unintentionally inserted between the infrared ray absorption surface and the substance to be detected, if the infrared ray absorption surface and the substance to be detected come into close contact with each other through such layer or space, there is a possibility that the substance can be detected by taking advantage of the high sensitivity and signal-to-noise ratio.

5-7. Plurality of Types of Patterns and Plurality of Wavelengths that are Matched to One Type of Substance to be Detected The structure 100 of FIG. 1 and the method of the infrared spectroscopy shown in FIG. 4 can be modified from various viewpoints, mainly, from the viewpoint of practicality. The substance to be detected generally shows one or more response wavelengths. Let the response wavelengths be the first and second response wavelengths which are different from each other. If the first and second response wavelengths are closely located, one detection wavelength range D can cover both of the wavelengths (for instance, FIG. 8). On the other hand, there is also a case where the first and second response wavelengths are too distant from each other to be covered by a single detection wavelength range D. In that case, if the detection wavelength range is set so as to include the first detection wavelength range which includes the first response wavelength and the second detection wavelength range which includes the second response wavelength, it becomes possible to perform analysis matching the substance to be detected.

Figure 10:
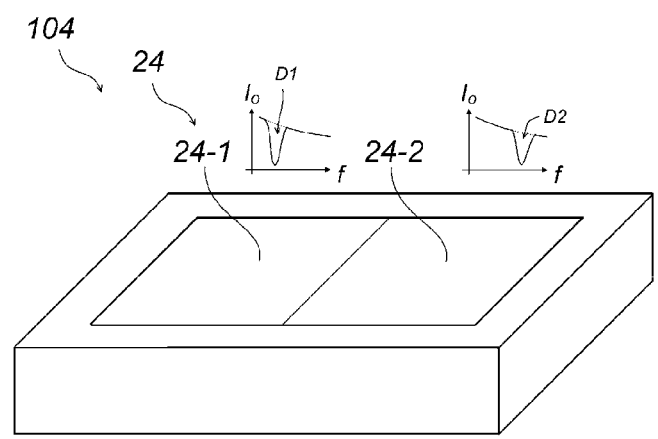
FIG. 10 is a schematic diagram showing an example of a structure that corresponds to a plurality of detection wavelength ranges, in the embodiment of the present disclosure.

FIGS. 10 and 11 are schematic views each showing such a configuration. A structure 104 having a plurality of types of groups of metal components typically has an infrared ray absorption surface 24-1 in which a first group of metal components for a detection wavelength range D1 are aligned in the infrared ray absorption surface 24, and an infrared ray absorption surface 24-2 in which a second group of metal components for a detection wavelength range D2 are aligned in the absorption surface 24, which are distinguishably formed (FIG. 10). Thereby, it becomes possible to realize an intensity spectrum which should be acquired when analyzing the substance to be detected, by such a simple operation of a level as to change an irradiation position on a piece of an object structure, as needed. In the case where the linear rib structure (FIG. 3) is adopted in which the ribbons are aligned, the infrared ray absorption surface 24-1 and the infrared ray absorption surface 24-2 can achieve detection wavelength ranges that fit for the response wavelengths respectively, by changing, for instance, a width w and a period A of the metal component 50.

Figure 11A:
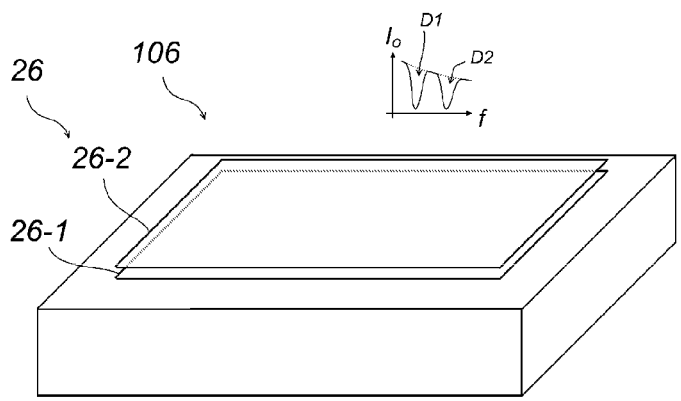
FIG. 11 has a schematic view (FIG. 11A) showing another example of the structure that corresponds to a plurality of detection wavelength ranges, in the embodiment of the present disclosure; and a perspective view (FIG. 11B) showing a structure in which the metal component forms a plurality of types of shapes, as a specific example of the above structure, in the embodiment.
Figure 11B:
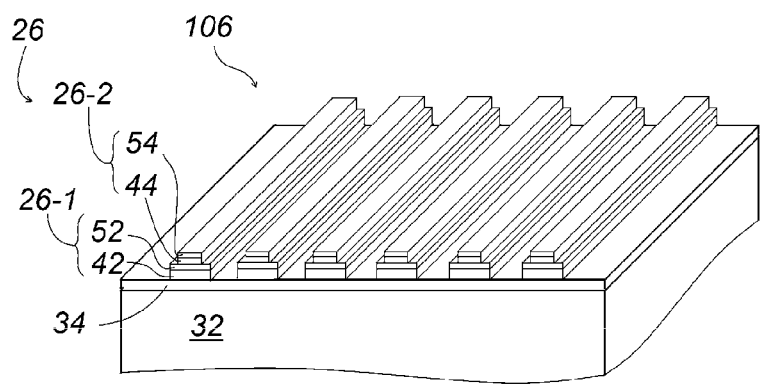

Moreover, in another typical example, as in the structure 106 having a plurality of types of groups of metal components shown in FIG. 11A, the infrared ray absorption surface 26 has such a plurality of types of metal components as an infrared ray absorption surface 26-1 for a detection wavelength range D1 and an infrared ray absorption surface 26-2 for a detection wavelength range D2, which are overlapped in the thickness direction. In the structure 106 of FIG. 11A, the two infrared ray absorption surfaces 26-1 and 26-2 are shown separately from each other for explanation, but may actually come into contact with each other or be integrated with each other. The infrared ray absorption surface 26-1 and the infrared ray absorption surface 26-2 which have been overlapped in such a way can be also achieved also by adopting the liner rib structure (FIG. 3) in which the ribbons are aligned. For instance, as shown in FIG. 11B, the structure employs a first type of metal component 52 and a second type of metal component 54 which have different widths w of the metal component 50, for instance. In this case, the infrared ray absorption surface 26-1 is achieved by a resonator which is formed of the metal component 54, a support part 44 and the metal layer 34. In addition, the infrared ray absorption surface 26-1 is achieved by a resonator which is formed of the metal component 52, a support part 42 and the metal component 34. Such a structure 106 can absorb infrared rays in both of the detection wavelength range D1 and the detection wavelength range D2 (FIG. 11A), only by using a piece of structure and using only one infrared beam for infrared spectroscopy.

The structures 104 and 106 illustrated in FIGS. 10 and 11 are especially useful for such a substance to be detected as to be easily detected if the substance is determined by a combination of a plurality of response wavelengths that resist being covered with only one detection wavelength range. In addition, also in the case where the substance to be detected itself is a mixture of a plurality of types of substances and shows a plurality of response wavelengths, the structures 104 and 106 are useful.

In the infrared spectroscopy adopting the structures 104 and 106, in place of the determination step S08 out of the processes shown in FIG. 4, a step of determining at least any of a presence/absence, a component content, a component type, a chemical structure and ambient information regarding the substance to be detected in a specimen is carried out, on the basis of reflection peaks of a plurality of response wavelengths (first and second response wavelengths) corresponding to the substance to be detected, which appears in the reflection spectrum of the infrared rays.

In the case where the substance to be detected showing a plurality of response wavelengths such as the first and second response wavelengths is determined to be the object in the present embodiment, it is also useful to use not a piece of structure but a plurality of pieces of structures which are manufactured so as to match each of the wavelengths. Briefly, it is assumed to have adopted a first structure having a first infrared ray absorption surface and a second structure having a second infrared ray absorption surface. At this time, the first and second infrared ray absorption surfaces are manufactured so as to absorb the infrared rays of the first and second detection wavelength ranges, respectively, and the first and second detection wavelength ranges are set so as to contain the first and second response wavelengths, respectively. In a typical case where such a plurality of pieces of structures are used, firstly a specimen that potentially contains the substance to be detected is brought into close contact with both of the infrared ray absorption surfaces of the first and second structures. Then, infrared rays having a wavelength range covering both the first detection wavelength range and the second detection wavelength range are operated so as to irradiate the first infrared ray absorption surface. Furthermore, the reflected infrared rays reflected from the first infrared ray absorption surface are operated so as to irradiate the second infrared ray absorption surface. Finally, the reflected infrared rays reflected from the second infrared ray absorption surface are detected by the detector. If a plurality of pieces of separate structures for different response wavelengths are combined in this way, the practicality of infrared spectroscopy can be improved, which is based on the plurality of response wavelengths of the substance to be detected. Incidentally, the first and second response wavelengths may originate in separate chemical bonds contained in the substance to be detected, or in separate modes of one chemical bond. Thereby, it becomes possible to acquire information on the plurality of response wavelengths with single measurement, and to detect a target substance to be detected while distinguishing the target substance from another substance having a similar response wavelength.

6. Summary

In the above, the embodiments of the present disclosure have been specifically described. The above described embodiments and structural examples have been described for explaining the disclosure, and the scope of the present disclosure should be determined on the basis of the description of the claims. In addition, modified examples existing within the scope of the present disclosure, which include other combinations of each of the embodiments, are also included in the scope of the claims. Some technology contents of the embodiments of the present disclosure have been disclosed in detail in non-patent Literatures 4 and 5, among the preceding reports by the present inventors, to such an extent that those skilled in the art can carry out, and the disclosed contents are quoted as they are and thereby shall be incorporated herein to the present specification.

INDUSTRIAL APPLICABILITY

The present disclosure can be used for such arbitrary devices as to detect, quantify or identify substances with the use of infrared rays.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCE SIGNS LIST 100, 102, 104 and 106 structure
20, 22, 24, 24-1, 24-2, 26-1 and 26-2 infrared ray absorption surface
30 metal substrate
32 substrate
34 metal layer 36 metal surface
40, 42 and 44 support part
50, 52 and 54 metal component
60 single split-ring resonator (SSRR)
62 3D split-ring resonator (3D-SRR)

The invention claimed is:

1. A structure for use in infrared spectroscopy having an infrared ray absorption surface configured to absorb infrared rays in a detection wavelength range covering a response wavelength of a substance to be detected, comprising:
 a metal substrate having a metal surface that provides the infrared ray absorption surface;
 metal components disposed at positions facing the metal surface; and
 a support part supporting each of the metal components relative to the metal surface,
 wherein the support part has a material and thickness that are configured such that the structure forms a resonator for the detection wavelength range, the resonator utilizing a phase shift and a phase retardation between electric polarization in the metal substrate and electric polarization in the metal components, and
 wherein the support part is formed of the infrared transmission layer that has been patterned so as to match shapes of the metal components.

2. The structure according to claim 1, wherein the metal components are formed of a patterned metal film.

3. The structure according to claim 1, wherein a metal material of the metal components includes at least any of the metal group consisting of gold, silver, copper, aluminum, and platinum.

4. The structure according to claim 1, wherein the metal components are linear ribbons, and the metal components form a pattern of linear ribs which is a set of the same type of ribbons.

5. The structure according to claim 1, wherein the metal components are island-shaped elements that are isolated from each other.

6. The structure according to claim 1, wherein the metal components are manufactured by photolithography or electron beam lithography.

7. The structure according to claim 1, wherein the metal components include metal components that are assembled or arranged by a self-assembling action.

8. The structure according to claim 1, wherein the metal substrate includes at least any of the metal group consisting of gold, silver, copper, aluminum, and platinum.

9. The structure according to claim 1, wherein the support part is an infrared transmission layer that allows infrared rays in the detection wavelength range to pass there through.

10. The structure according to claim 1, wherein
 the substance to be detected has at least two response wavelengths including first and second response wavelengths different from each other, and
 the detection wavelength range includes a first detection wavelength range covering the first response wavelength, and a second detection wavelength range covering the second response wavelength.

11. A method of infrared spectroscopy for a substance to be detected, comprising steps of:
 providing a structure for use in the infrared spectroscopy, which has an infrared ray absorption surface configured to absorb infrared rays in a detection wavelength range covering a response wavelength of the substance to be detected, wherein the structure has a metal substrate having a metal surface that provides the infrared ray absorption surface, metal components disposed at positions facing the metal surface, and a support part supporting each of the metal components relative to the metal surface, wherein the support part has a material and thickness that are configured such that the structure forms a resonator for the detection wavelength range, the resonator utilizing a phase shift and a phase retardation between electric polarization in the metal substrate and electric polarization in the metal components, in such a state that a specimen potentially containing the substance to be detected is brought into close contact with the infrared ray absorption surface and the support part is formed of the infrared transmission layer that has been patterned so as to match shapes of the metal components;
 irradiating the infrared ray absorption surface with the infrared rays in the detection wavelength range; and
 detecting an intensity spectrum of reflected infrared rays from the infrared ray absorption surface.

12. The method according to claim 11, wherein
 the irradiating step is a step of irradiating the infrared ray absorption surface with the infrared rays from an incidence direction inclined to the surface, and
 the detecting step is a step of detecting a reflection peak at a wavelength corresponding to the response wavelength in the detection wavelength range for the reflected infrared rays.

13. The method according to claim 12, further comprising a step of:
 determining at least any of a presence/absence, a component content, a type, a chemical structure, and ambient information regarding the substance to be detected in the specimen, based on the reflection peak which corresponds to the substance to be detected and appears in an intensity spectrum of the reflected infrared rays.

* * * * *